US00RE44378E

(19) United States
(12) Reissued Patent
Borkowski et al.

(10) Patent Number: US RE44,378 E
(45) Date of Reissued Patent: Jul. 16, 2013

(54) CELLULAR NETWORK-BASED LOCATION SYSTEM

(75) Inventors: Daniel Borkowski, Lunenburg, MA (US); Robert D. Packard, II, Acton, MA (US); Hingsum F. Fung, Needham, MA (US); Hadi F. Habal, Geneva (CH); Manuel Maseda, Tampa, FL (US); Sheng-Roan Kai, Norcross, GA (US); Kenneth Chao, Wanchai (HK)

(73) Assignee: Verizon Laboratories Inc., Waltham, MA (US)

(21) Appl. No.: 11/526,294

(22) Filed: Sep. 25, 2006
(Under 37 CFR 1.47)

Related U.S. Patent Documents

Reissue of:
(64) Patent No.: 5,519,760
Issued: May 21, 1996
Appl. No.: 08/263,592
Filed: Jun. 22, 1994

U.S. Applications:
(63) Continuation of application No. 09/969,637, filed on Oct. 4, 2001, which is a continuation of application No. 09/080,270, filed on May 18, 1998, now Pat. No. Re. 38,267.

(51) Int. Cl.
*H04M 11/04* (2006.01)

(52) U.S. Cl.
USPC ..... 455/404.2; 455/456.1; 455/404.1; 455/422.1; 455/432.1; 455/435.1; 455/436; 455/446; 455/457; 455/518; 455/456.6; 455/519; 455/520; 455/41.2; 340/8.1; 340/990; 342/454; 342/457; 701/400

(58) Field of Classification Search
USPC ..... 455/33.1; 379/59, 60; 370/352, 353
See application file for complete search history.

(56) References Cited

U.S. PATENT DOCUMENTS 4,445,118 A 4/1984 Taylor et al.
4,651,157 A 3/1987 Gray et al.

(Continued)

FOREIGN PATENT DOCUMENTS

CA 2139514 12/1994
CA 2161333 5/1998

(Continued)

OTHER PUBLICATIONS

Compatibility Information for Interconnection of a Wireless Service Provider and Local Exchange Carrier Network, TA-NPL-000145, Issue 2, Bell Communications Research, Aug. 1993, 111 pages.

(Continued)

*Primary Examiner* — Temesgh Ghebretinsae
*Assistant Examiner* — Richard Chan

(57) ABSTRACT

In a cellular system configuration, the location of a mobile station is determined from the acquisition of cellular network data pertaining to the mobile station, and the translation of such network data into a corresponding geographical position profile. The cellular system includes a mobile station locator entity for receiving from a mobile switching center the network data such as cell and/or sector ID and trunk group member number. The mobile station locator translates the network data into position information such as geographic coordinates (latitude and longitude), resolution (radius), and angle values for sectorized cells.

25 Claims, 4 Drawing Sheets

U.S. PATENT DOCUMENTS

| | | | | | |
|---|---|---|---|---|---|
| 4,654,867 | A | | 3/1987 | Labedz et al. | |
| 4,737,978 | A | | 4/1988 | Burke et al. | |
| 4,748,655 | A | | 5/1988 | Thrower et al. | |
| 4,750,197 | A | | 6/1988 | Denekamp et al. | |
| 4,754,465 | A | | 6/1988 | Trimble | |
| 4,809,005 | A | | 2/1989 | Counselman | |
| 4,912,756 | A | | 3/1990 | Hop | |
| 5,014,206 | A | | 5/1991 | Scribner et al. | |
| 5,043,736 | A | | 8/1991 | Darnell et al. | |
| 5,055,851 | A | | 10/1991 | Sheffer | |
| 5,081,703 | A | | 1/1992 | Lee | |
| 5,095,500 | A | | 3/1992 | Tayloe et al. | |
| 5,155,689 | A | | 10/1992 | Wortham | |
| 5,208,756 | A | | 5/1993 | Song | |
| 5,218,367 | A | * | 6/1993 | Sheffer et al. | 342/457 |
| 5,221,925 | A | | 6/1993 | Cross | |
| 5,235,633 | A | | 8/1993 | Dennison et al. | |
| 5,293,645 | A | | 3/1994 | Sood | |
| 5,299,132 | A | | 3/1994 | Wortham | |
| 5,327,144 | A | | 7/1994 | Stilp et al. | |
| 5,334,974 | A | * | 8/1994 | Simms et al. | 340/990 |
| 5,371,781 | A | | 12/1994 | Ardon | |
| 5,388,147 | A | | 2/1995 | Grimes | |
| 5,398,190 | A | | 3/1995 | Wortham | |
| 5,432,841 | A | * | 7/1995 | Rimer | 455/457 |
| 5,442,684 | A | | 8/1995 | Hashimoto et al. | |
| 5,479,482 | A | | 12/1995 | Grimes | |
| 5,508,708 | A | | 4/1996 | Ghosh et al. | |
| 5,519,621 | A | | 5/1996 | Wortham | |
| 5,519,760 | A | | 5/1996 | Borkowski et al. | |
| 5,542,100 | A | | 7/1996 | Hatakeyama | |
| 5,544,225 | A | | 8/1996 | Kennedy et al. | |
| 5,548,583 | A | | 8/1996 | Bustamante | |
| 5,561,704 | A | | 10/1996 | Salimando | |
| 5,561,840 | A | | 10/1996 | Alvesalo et al. | |
| 5,577,022 | A | | 11/1996 | Padovani et al. | |
| 5,614,914 | A | | 3/1997 | Bolgiano et al. | |
| 5,663,990 | A | | 9/1997 | Bolgiano et al. | |
| 5,736,964 | A | | 4/1998 | Ghosh et al. | |
| 5,764,188 | A | | 6/1998 | Ghosh et al. | |
| 5,815,814 | A | | 9/1998 | Dennison et al. | |
| RE35,916 | E | | 10/1998 | Dennison et al. | |
| 5,859,879 | A | | 1/1999 | Bolgiano et al. | |
| 5,878,038 | A | | 3/1999 | Willey | |
| 5,920,549 | A | | 7/1999 | Bruckert et al. | |
| 5,943,014 | A | | 8/1999 | Gilhousen | |
| 5,945,948 | A | | 8/1999 | Buford et al. | |
| 6,005,854 | A | | 12/1999 | Xu et al. | |
| 6,018,662 | A | | 1/2000 | Periyalwar et al. | |
| 6,061,337 | A | | 5/2000 | Light et al. | |
| 6,081,229 | A | | 6/2000 | Soliman et al. | |
| 6,097,954 | A | | 8/2000 | Kumar et al. | |
| 6,118,767 | A | | 9/2000 | Shen et al. | |
| 6,292,671 | B1 | | 9/2001 | Mansour | |
| 6,321,089 | B1 | | 11/2001 | Han | |
| 6,337,983 | B1 | | 1/2002 | Bonta et al. | |
| 6,351,642 | B1 | | 2/2002 | Corbett et al. | |
| 6,421,009 | B2 | | 7/2002 | Suprunov | |
| 6,514,914 | B1 | | 2/2003 | Paliyath et al. | |
| RE38,267 | E | | 10/2003 | Borkowski et al. | |
| 6,928,066 | B1 | | 8/2005 | Moon et al. | |
| 6,963,755 | B2 | | 11/2005 | Chen et al. | |
| 6,972,717 | B2 | | 12/2005 | Sollenberger et al. | |
| 2002/0082037 | A1 | | 6/2002 | Salonaho et al. | |

FOREIGN PATENT DOCUMENTS

| | | |
|---|---|---|
| CA | 2122988 | 10/1999 |
| CA | 2069230 | 7/2002 |
| CA | 2149135 | 9/2003 |
| EP | 0484067 | 5/1992 |
| WO | WO-89/12835 | 12/1989 |
| WO | WO-94/01978 | 1/1994 |

OTHER PUBLICATIONS

"Trimpack," Product advertisement including spec sheet, Trimble Navigation Ltd, Copyright May 1989, 2 pages.

Reynolds et al., "GPS-Based Vessel Position Monitoring and Display System," IEEE 1990 Position Location and Navigation Symposium, Mar. 20, 1990, IEEE AES Magazine, pp. 16-22.

"GPS—Based Vessel Position Monitoring and Display System", IEEE 1990 Position Location and Navigation Symposium, Mar. 20, 1990.

Trimble Data Sheet dated May 1989 disclosing hand held GPS Receiver Sold by Trimble Navigation under the name "TRIMPACK".

* cited by examiner

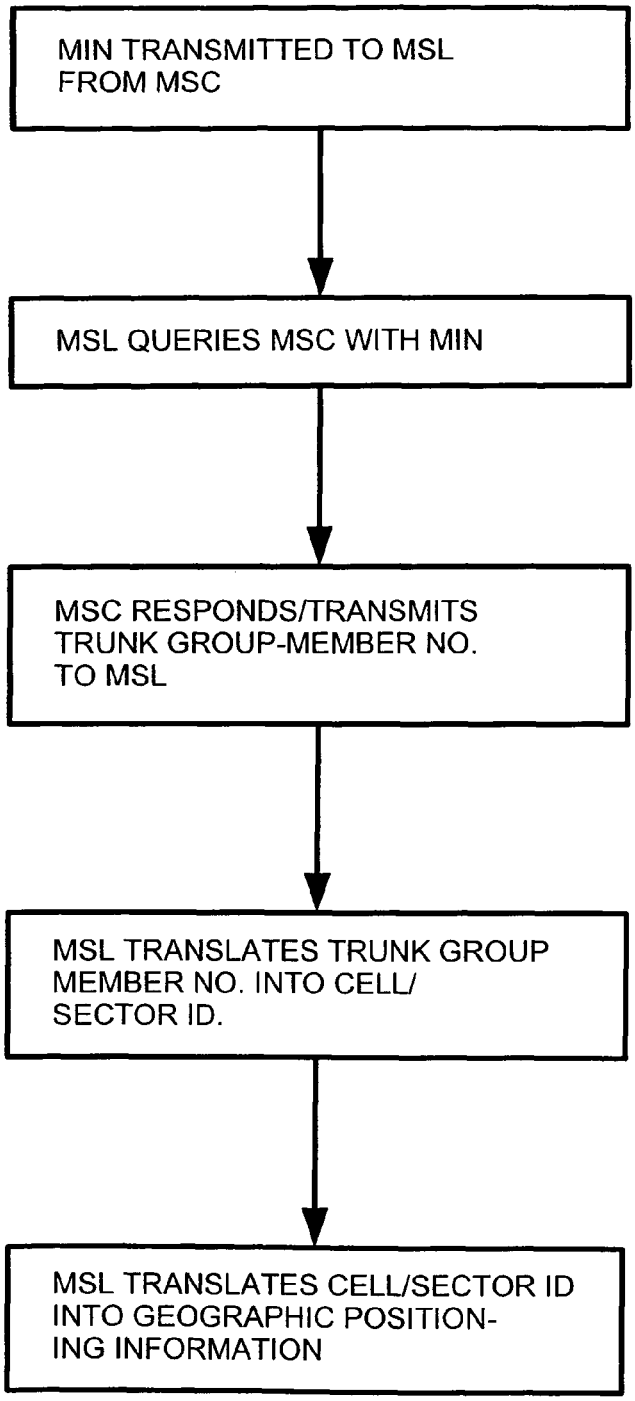
*FIG. 1*
AMENDED

CELLULAR NETWORK-BASED LOCATION SYSTEM

Matter enclosed in heavy brackets [ ] appears in the original patent but forms no part of this reissue specification; matter printed in italics indicates the additions made by reissue.

*CROSS REFERENCE TO RELATED APPLICATIONS*

*This is a continuation of Reissue application Ser. No. 09/969,637 filed Oct. 4, 2001, which is a continuation of Reissue application Ser. No. 09/080,270 filed May 18, 1998, now U.S. Pat. No. Re. 38,267, which is a reissue of U.S. Pat. No. 5,519,760, all of which are incorporated herein by reference. Benefits under 35 U.S.C. 120 are hereby claimed.*

FIELD OF THE INVENTION

The present invention relates to cellular communication systems and, more particularly, to a cellular configuration for determining the location of a mobile station.

BACKGROUND OF THE INVENTION

The increased terminal mobility offered by cellular telephone networks as well as mobile radio data networks has brought about an increased demand for location-based services and applications. Fleet operators are interested in automated vehicle tracking applications to enhance their dispatch operations. Moreover, stolen vehicle recovery systems have enjoyed a significant amount of success during the past few years. However, most efforts to date have been designed around specialized equipment employed at the mobile operator site for acquiring location information. For example, U.S. Pat. No. 5,043,736 to Darnell et al. discloses a cellular position locating system where the location of a remote unit is derived from data transmitted by a global positioning system to a specially equipped receiver at the remote unit.

SUMMARY OF THE INVENTION

The present invention concerns, in a cellular system comprising a plurality of cell sites each including a plurality of mobile stations in communication with a base station, and comprising a plurality of interconnected mobile switching centers each in communication with the base stations of certain cell sites, wherein each mobile switching center maintains network identification data for each mobile station being served in said certain cell sites, a method of determining the location of a mobile station originating communications within a cell site, comprising the steps of: acquiring the network identification data for said mobile station from the mobile switching center serving said cell site; and translating said acquired network identification data into geographical location information.

In another aspect the present invention concerns, in a cellular system comprising a plurality of cell sites each including a plurality of mobile stations in communication with a base station, and comprising a plurality of interconnected mobile switching centers each in communication with the base stations of certain cell sites, wherein each mobile switching center maintains network identification data for each mobile station being served in said certain cell sites, a method of determining the location of a mobile station originating communications within a cell site, comprising the steps of: transmitting from the mobile switching center a cellular channel including the network identification data for said mobile station; receiving the transmitted network identification data; and translating the received network identification data into geographical location information.

BRIEF DESCRIPTION OF THE DRAWINGS

FIG. 1 is a flowchart depicting a communications sequence in accordance with one embodiment of the present invention;

DETAILED DESCRIPTION OF THE PREFERRED EMBODIMENTS

Figure 2:
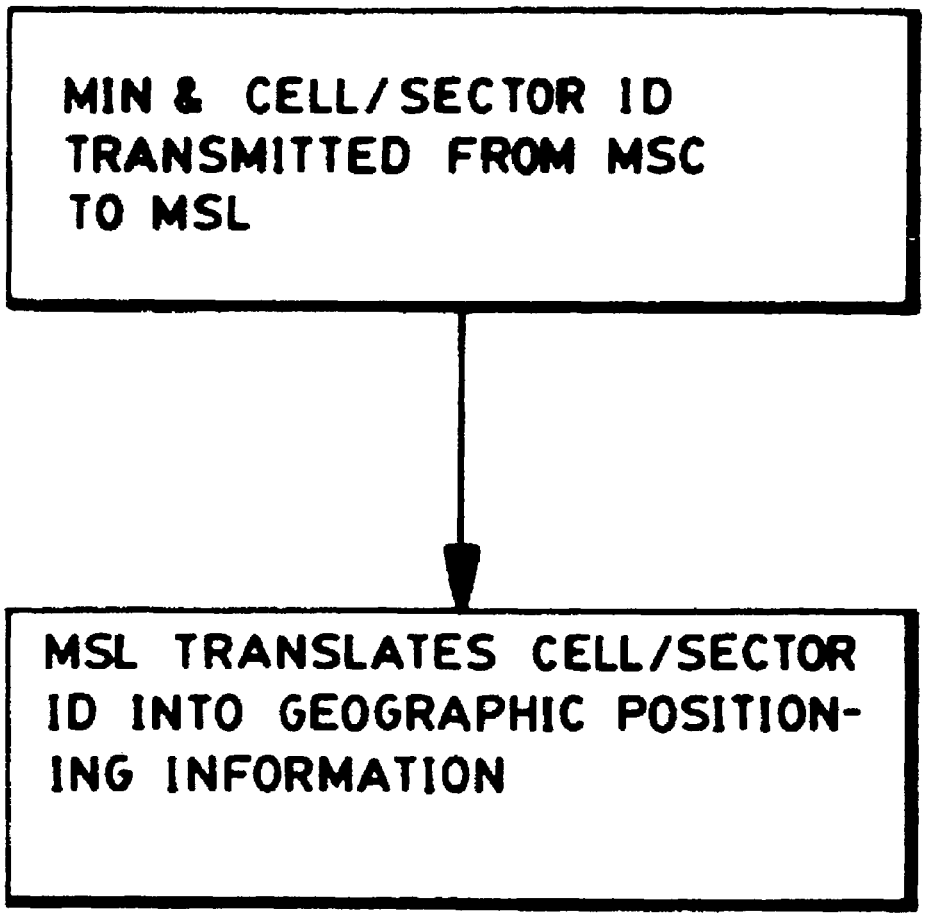
FIG. 2 is a flowchart depicting a communications sequence in accordance with another embodiment of the present invention.

The implementation of certain cellular services requires that the mobile station location be made available to the service provider. For example, in a 911 emergency service, medical personnel need an accurate and precise reading on the source of a distress call in order for prompt medical attention to be made available within the entire coverage area of single or multi-carrier cellular networks. Although the location finding system disclosed by Darnell et al., supra, conveys highly accurate positional information from a modified mobile station specially configured to interface with a GPS system, a more desirable system from a subscriber perspective would keep intact the existing mobile station configuration.

The present invention concerns an enhancement to the existing cellular network topology permitting the acquisition of a mobile station location using cellular parameters from the network. The cellular parameters define the placement of each mobile station within its cellular network and its relationship to other mobile stations. For example, the parameters may include data identifying the communications trunk group serving the mobile station, a member number, and cell and/or sector ID. An accurate conversion of cellular data into a geographical profile may be performed using radio plans as a translational mechanism. The radio plans, which correspond to geographic maps of radio coverage, furnish information such as the latitude and longitude derived from the cell base station antenna location, elevation, radius, and angles for sectorized cells.

For purposes of discussion and clarity, the term "mobile station locator" (MSL or "Locator") is used hereinafter to encompass a facility, mechanism, or assembly in whatever form implemented, constructed, or operable, which interacts with and is the recipient of location-determinative cellular data from the cellular network. The MSL itself maintains an information resource responsive to input cellular data for generating a corresponding geographical location estimate. The resource is constructed by accumulating position data from radio coverage maps, for example, where cellular data is translatable into geographical information.

The basic configuration of a cellular network includes a plurality of base stations defining cell sites and providing wireless communication to mobile station units within the cell site coverage area. The cellular network is further configured with a plurality of mobile switching centers in communication with the base stations and other switching centers to perform processing and switching functions enabling connections between mobile stations and interfacing to external networks such as the PSTN.

In one embodiment of the present invention detailed in the flow diagram sequence of FIG. 1, a code representing the identity of a mobile station is transmitted from the mobile switching center (MSC or "Center") to the mobile station locator. In particular, the identity code corresponds to a mobile Identification Number (MIN) and/or an Electronic Serial Number (ESN). The Locator then queries the Center with the MIN, requesting network data on the mobile station having the designated MIN. In response to this query, the Center retrieves the requested information such as trunk group and member number, and then forwards it to the Locator. A translation operation at the Locator converts the cellular network data into corresponding geographical location information.

In another embodiment of the present invention detailed in the flow diagram sequence of FIG. 2, cellular network data is transmitted along with the MIN from the Center to the Locator; accordingly, in this embodiment, the Locator does not prompt the Center for cellular data. In a preferred implementation, the Center invokes the transmission of cellular data pertaining to a mobile station in response to a trigger command from the mobile station represented by certain dialed mobile digits known as a feature code.

Figure 3:
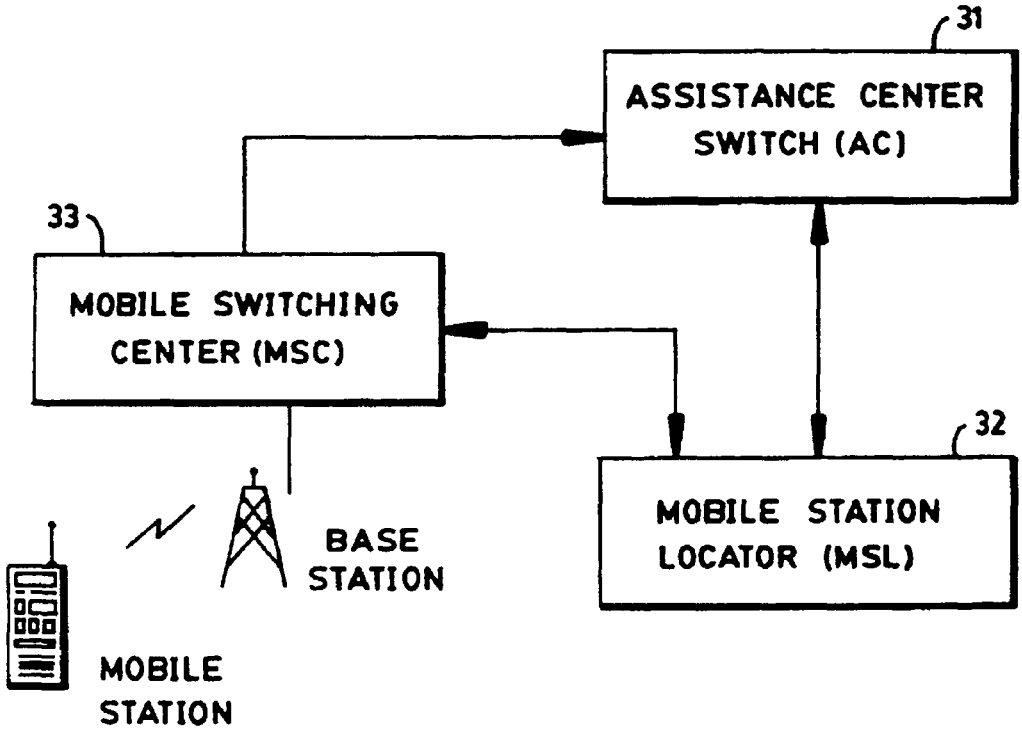
FIG. 3 is a block diagram of a mobile system configuration employing the present invention.

FIG. 3 is a system level block diagram illustratively representing a cellular configuration for implementing the present invention. For purposes of investigating the location-finding capability, an Assistance Center 31 was included to monitor the call from the mobile station and the position information from the Mobile Station Locator (MSL) 32. In particular, AC 31 is an entity receiving a voice channel over a cellular link connected to the Mobile Switching Center (MSC) 33, and receiving the geographical location data from Locator 32. The Assistance Center 31 includes a processing center with dispatching and/or storage capabilities which receives user calls and location data and provides services based upon that information. The Assistance Center 31 specifically contains equipment which provides the capability for a call-taker (i.e., operator or dispatcher) to talk with the cellular phone caller and display the caller's position on a graphical display.

The Mobile Switching Center 33 is a cellular telephone network switch that provides processing and switching functions to allow cellular phones to communicate with other phones (cellular and wireline). The Mobile Station Locator 32 is a facility performing the retrieval and storage of location information pertaining to mobile stations. In particular, Locator 32 receives, retrieves, stores and processes location information, and then furnishes it to AC 31. The Locator 32 is equipped with an MSL-MSC Interface (MMI) that performs the retrieval of location information from the Mobile Switching Center 33.

Base stations, also called cell sites, are connected to Center 33 and provide radio communication with the cellular phones. Base stations can be configured with omnidirectional or sectorized antennas. An omni cell provides radio coverage radiating out from the cell center in all directions; this type of a cell may be approximated by a circle on a map. A sectorized cell has antennas which provide coverage for a section of the circle; this type of a cell may be approximated by a pie-wedge shape on a map.

The cellular configuration shown in FIG. 3 was exercised during a Location Assistance and Tracking Information Service (LATIS) field trial demonstration to explore the methods by which the location of a mobile station (e.g., cellular phone) originating a call may be made available to entities both internal and external to the cellular network. The Locator 32 principally serves the function of collecting location data from the cellular network, translating it, and providing it to AC 31. The location data comprised the geographic coordinates and size of the serving cellular network cell site (e.g., base station). The resolution of this location data was limited by the size of the cell site; however, the resolution of the data from multiple cell sites was enhanced by sector information such as the cell subset/section.

The LATIS trial activated the acquisition mode to determine a mobile station's position by engaging the operator into initiating a call into *the cellular network. In particular, the mobile station operator dialed a recognizable feature code (FC) on a standard cellular phone. The Center 33 recognized the feature code and connected the call to AC 31 for establishing a voice connection between the answering personnel and the caller.

The acquisition of location information by Locator 32, and its subsequent delivery to AC 31, is accomplished during the LATIS trial by a first and second transport scheme hereinafter designated Methods I and II. In Method I, Center 33 transmits the caller's identity to AC 31 over a network connection. The caller's identity is defined by a Mobile Identification Number (MIN) which corresponds to the telephone number of the station originating a call. For the purposes of the trial, the MIN was ten (10) digits in length.

The AC 31 responds by forwarding to Locator 32 a message containing the caller's MIN in order to request cellular data relevant to the MIN. The Locator 32 then interacts with Center 33 to retrieve the cell-site trunk currently in use by that particular mobile station. The Locator 32 converts the trunk information received from Center 33 into a location value including a geographic coordinate (latitude and longitude), a resolution parameter (radius), and possibly two angle values (for sectorized cells). This information is then formatted and transmitted to AC 31 for graphical display. Depending upon the type of base station currently serving the cellular phone, the location value may be displayed by AC 31 in different ways, such as with a circle described by the geographic coordinate and the resolution, or a pie-wedge conveying this information and supplemented with the two angle values.

In Method II, Center 33 multiplexes the caller's identity (e.g., MIN) with cellular network data and transmits the combined signal to AC 31. For example, Center 33 may outpulse the MIN plus a 5-digit code representing the serving cell/sector. The AC 31 receives this code and forwards it to Locator 32, which converts it into a geographical location value that is transmitted to AC 31 for graphical display. The following table summarizes the features of the transport methods used during the trial.

| Location Transport Method | Mobile Dialed Digits (Feature Code) | Signaling Data Outpulsed from MSC to AC |
|---|---|---|
| I | *57 | MIN (10) |
| II | 211 | MIN (10) + cell & sector (5) |

Although the LATIS field trial included specific routes for communicating cellular network data to Locator 32, these routes are indicated for illustrative purposes only and should not serve as a limitation of the present invention. Rather, the cellular network data may be transmitted to Locator 32 directly or indirectly via any type of communications link. Furthermore, the network data may be transmitted before or contemporaneously with the voice channel. For example, the voice channel may be forwarded to AC 31 or another entity over one link, while the network data may be independently routed over an alternative path to Locator 32. In addition, the MIN and/or network data (depending upon the application) may be multiplexed with the voice channel before transmission from Center 33.

Likewise, even though in Method I the Locator 32 was prompted with the MIN by Assistance Center 31, and in Method II the cell/sector location data was initially transmitted to AC 31 before being coupled to Locator 32 for conversion, this supervisory/coordinating role of AC 31 should not serve as a limitation of the present invention. Rather, it should be apparent to those skilled in the art that the MIN for Method I and the cellular network data for Method II could be transmitted directly to Locator 32 from Center 33, while the voice communication would be separately transmitted by Center 33 to AC 31 or any other end user.

Figure 4:
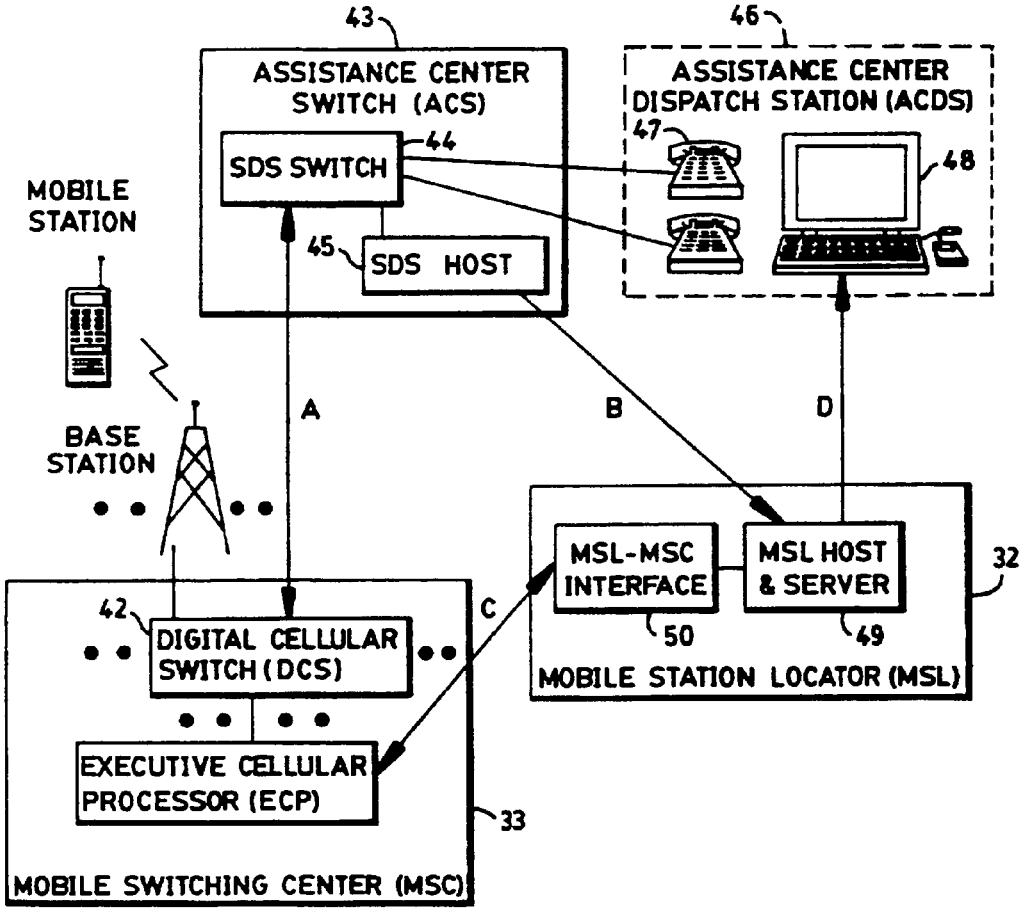
FIG. 4 is a detailed block diagram representation of the mobile system configuration in FIG. 3.

FIG. 4 is a further block diagram representation of the cellular configuration in FIG. 3. The specific components, subsystems, and other entities mentioned in conjunction with FIG. 4 should not be viewed as a limitation of the present invention, but as representative of one implementation of the cellular configuration. It should be apparent to those skilled in the art that the functions demonstrated in FIG. 4 may be implemented by other equivalent means.

The mobile station employed standard cellular phones such as Motorola transportable cellular phones which did not require any non-standard modifications. The phones were initialized with MINs (telephone numbers) from the serving GTE Mobilnet cellular system so that the phone would be on its "home" system throughout the trial.

The Mobile Switching Center 33 was an AT&T Autoplex System 1000 comprising one Executive Cellular Processor (ECP) 41 and several Digital Cellular Switches (DCS) 42. Each DCS 42 is connected to several base stations (cell sites). The only hardware modification made to Center 33 was the connection of a dedicated T-1 span (trunk group) to carry the test calls to an Assistance Center Switch 43. The link between the DCS 42 and ACS 43 is designated interface A in FIG. 4.

The ECP 41 was modified to provide the necessary digit translation, call routing, and trunk signaling. The following discussion enumerates the modifications made to certain forms of ECP 41.

(1) The Subscriber and Feature Information Form was modified to add Primary Dialing Class 22. The MIN of each test phone was part of Dialing Class 22; this class was created for the trial to restrict tile dialing capabilities of the test phones and to prevent interference with the live traffic.

(2) Pattern matching was added to the Dialing Plan form (DPLAN). These modifications specified the feature codes that were used. If the dialed digits received form the mobile station matched *57 (Method I), or 211 (Method II), a Destination Index of 911 for the DXDRTE route and a Dialed Number Modification (DNMOD) of 13 were assigned. If the digits matched *58+12 or more digits (which would be latitude/longitude), a Destination Index of 911 and a DNMOD of 14 were assigned.

(3) Dialed Number Modification (DNMOD) 13 performed cell and sector matching. If the call originated from one of the cells/sectors in the table, a corresponding set of digits was added to the dialed digits (*57 or 211), and the entire set was routed to the Digit-By-Digit Call Routing (DXDRTE).

(4) Dialed Number Modification (DNMOD) 14 performed latitude and longitude translation. The *58 was deleted from the incoming digits, and the remaining lat/long digits were routed to the Digit-By-Digit Call Routing (DXDTRE).

(5) The Digit-By-Digit Call Routing (DXDTRE) assigned an outgoing trunk group and outpulsed the digits. The Feature Group D signaling method was used. The caller's MIN was outpulsed in the ANI (Automatic Number Identification) field, and the digits sent by the DNMOD forms were outpulsed in the Called Address field.

As noted above, Assistance Center 31 in FIG. 3 is equipped with means for communicating with the mobile station via the cellular network over a communications link such as a voice channel, and for receiving and displaying the geographical position information of the mobile station caller. The Assistance Center 31 is represented in FIG. 4 as an Assistance Center Switch (ACS) 43 and an Assistance Center Dispatch Station 46, discussed infra. The ACS 43 contains telephone switching equipment capable of receiving and discerning identity and location information pertaining to incoming calls, and routing those calls to operators as necessary.

The ACS 43 is configured to include a Summa Four SDS-500 switch 44 which was configured with two T1 cards, one used during the trial and the other used for testing. The ACS 43 may further include a dial tone generator, an MF (multi-frequency) card for inband signaling-data capture, and an SLIC card to control attached telephone sets if so desired. A dedicated T1 span (interface A) from Center 33 was connected to one of the T1 cards; calls from Center 33 entered through ports on this card. The SDS switch 44 was controlled by all SDS host 45 which was running the SDS control software. The switch 44 communicated switch-related information and activity to the host 45 through reports; the host 45 issued commands to control the switch 44; and the switch 44 responded to commands with responses. The SDS host machine 45 was an HP-9000 series workstation.

The control software for the switch 44 was written in the C programming language and comprised five main modules (discussed infra) to execute the functions of receive messages, send messages, signal capture, analyze number, and prepare MSL input.

Receive Messages module

This module received messages from the SDS switch 44. This module was designed to support different types of applications; based upon the destination code and function ID in a message, the message was forwarded to an application module. For the trial, only one module, namely the signal capture module, was used.

Send Messages module

This module received messages from host modules and queued them for transmission to the switch. It returned several status responses to the calling module, including socket full/output pending and communication error.

Signal Capture module

This module reacted to changes in the T1 and telset resources; these changes were sent to the host via Inpulse Rule Complete reports, Incoming Port Change reports, Outgoing Port change reports, or responses to Outgoing Port Control commands. Based upon the report, a command was built and sent to the switch via the Send Messages module.

The commands included the resource's virtual communication address, and were formulated with the SDS Application Program Interface (API).

The Inpulse Rule Complete report indicated that the signaling information from an inbound call (on the T1 span) was complete. The received signaling data were then sent to the Analyze Number module for analysis and further action.

Analyze Number module

This module analyzed the digits received by the signal capture module to determine which set of location data it contained (e.g., latitude & longitude, cell & sector, or none). The location data were then reformatted into a location information set and sent to the Prepare MSL Input module.

Prepare MSL Input module

This module prepared a location record for the MSL from the given location information set. If any error in the location set was detected, an appropriate error message was written to a log file. Otherwise, a data record was passed immediately to Locator 32 via the Send Messages module.

Additionally, this module sent an Outgoing Port Control command to the switch to perform an Outpulse Rule (ringing, etc.) for an ACDS telset (discussed infra). Since six telsets were used, if the first one was busy, the second one rang; if they both were busy, the call was queued (with ringback heard by the caller), and the first available telset received the call.

As noted above, the Assistance Center may also include an Assistance Center Dispatch Station (ACDS) 46 for housing telephone dispatching equipment 47 that enables an operator to talk with a caller and process the caller's location. This phone equipment would be interfaced to the SDS switch 44 through the SLIC card.

The ACDS comprised six standard telephones 47 and one HP-9000 series workstation 48. The telephones 47, connected to the ACS 43, allowed the operator to communicate with the callers/testers. Two software applications ran on the workstation: a Geographic Information System (GIS) for electronic mapping of callers' locations and a Graphical User Interface (GUI) which allowed the operator to quickly collect test scenario data.

The Geographic Information System is an X Window application which displays geographic data. In addition, GIS contains highly powerful algorithms for determining the shortest route/path between any two or more points. The following features were specifically added for use in the trial.

A feature was added to display incoming location data with a car icon; this corresponded with "exact" locations where latitude and longitude data were present.

A feature was added to display incoming location data with a circle; this corresponded with locations from omnidirectional base stations.

A feature was added to display incoming location data as a pie-wedge (section of a circle); this corresponded with locations from sectorized base stations.

Capabilities were added to retrieve and delete the information related to a call. While any icon was illuminated, the operator could click on the icon and retrieve the specific information related to that call: MIN, latitude & longitude (if applicable), and cell/sector values (if applicable). The operator could also delete the entry, at which point the icon would be removed.

The GUI assists the operator in the gathering of necessary information. The GUI was built using X Windows/Motif 1.1 widget family, and includes a menu bar with twelve fields which the operator can fill with test information. The fields are delineated below.

(a) Dialing MIN: The tester's MIN.
(b) Date: The date and times were obtained from the workstation's operating system.
(c) Dial Type: The dialing types (Method I or II) are listed.
(d) Cell: The name and number of the test cells were listed.
(e) Cell_id: The number of the cell used.
(f) Sector: The sector used by the tester in that cell.
(g) Caller: Caller's name.
(h) Call_taker: The operator's name.
(i) Weather: Four conditions were listed: sunny, partly cloudy, rainy, and foggy.
(j) Location: Thirty-two pre-assigned test locations were listed.
(k) Result: Pass or fail result was given to each test_index.
(l) Duration: Three call-duration times were listed: less than ten seconds, less than one minute, and greater than one minute.

A comment field was also provided to function as a server for location information. The Mobile Station Locator 32 was implemented with an HP-9000 series workstation.

The Locator 32 included an MSL Host & Server unit 49 containing software written in C and comprising the following six modules: main control, request, query-one, query-all, database-retrieval, GIS-interface. The MSL server 49 was designed to handle multiple simultaneous calls and operated as follows. The main control module waited for an incoming request from the ACS 43 (via interface B). For each incoming call, if the location data were present, the MSL server 49 translated it (if necessary) and formatted a data message which was sent to the ACDS 46. If the incoming call did not contain location data, the MSL server 49 checked if information from a Mobile Switching Center was included; if the Center was known, Locator 32 interacted with that particular Center using the query-one module. If the Center was not known, Locator 32 had the capability to interact with all connected Mobile Switching Centers using the query-all module. Both types of query modules were designed to use an MSL-MSC interface module 50, discussed below.

To ascertain the performance of the Mobile Station Locator 32, the main control module recorded the following events, with time-stamps, in log files:

incoming mobile station call message received;
query sent to MSC interface process by the MSC query process;
query response received from the MSC interface process; and
mobile station location record sent to ACDS.

MSL-MSC Interface

The purpose of the MSL-MSC Interface (MMI) module 50 is to perform MSC-specific processing to retrieve location information. The MMI 50 was written as an Expect script using TCL (Tool Command Language). The MMI 50 login routine established a connection with the Autoplex ECP 41 Recent Change port through the workstation's serial port. During the trial, this connection involved dialing a modem and logging into the ECP 41, all of which were handled automatically by the MMI 50. Once a connection was established, the MMI 50 main program continuously scanned an input file for query requests from the MSL server 49.

When a query request was found, the MMI 50 would issue an OP:DN command to the ECP 41; this command would contain the MIN received from Locator 32 in the query request message. Under normal operating circumstances, ECP 41 would return an MCR (Mobile Call Register) value. The MMI 50 would then issue an OP:MCR command with the MCR value. Under similar operating circumstances, ECP 41 would return, among other data, the cell site trunk information corresponding with the trunk currently serving the mobile station. The MMI 50 returned this information (trunk group and member number) to the MSL server 49 by writing it into an output file. If any errors were encountered, the MMI 50 would write an appropriate error message into the output file.

MSL Data Message Formats and Translations

The Locator 32 receives location data and performs conversions to provide a uniform output message format to applications (API). An illustrative output message format is as follows:

| | | |
|---|---|---|
| cell and sector | 4 | characters |
| longitude | 8 | |
| latitude | 8 | |
| elevation | 5 | |
| radius | 5 | |
| starting angle | 5 | |
| real coverage angle | 5 | |
| message/comments | 125 | |

A space was used to delimit each field.

The MSL host 49 executes certain conversion operations to properly translate the cellular network identification data for a specified mobile station into geographical position information. For example, transport Method I provides trunk group and member number data from the MSL-MSC Interface 50 to the MSL host 49. This data is translated in a first conversion operation into cell ID and sector ID information. In a second conversion operation, employed as a principal operation for transport Method II or as a secondary operation for transport Method I, the input data comprising cell/sector ID is converted into latitude and longitude, resolution (radius), angle 1, and angle 2.

The conversion operations are preferably performed using indexable tables previously generated and stored at Locator 32. The data for the first conversion operation was obtained, for example, from lists of trunk groups and member numbers used by each cell site (categorized by cell ID and/or sector ID). The data for the second conversion operation was gathered from radio plans (geographic maps of radio coverage) for the cells chosen for the trial, and organized into a tabular format. The latitude and longitude of each cell were taken directly from these radio plans using the base station antenna location as an index. The angles for sectorized cells were also extracted from the radio plans and other tables. The resolution of each cell/sector was determined from the radio plans as the distance from its center to the furthest point that provided at least −75 dB radio signal coverage. The −75 dB figure was preferably used as a measure of the signal strength necessary to qualify as a threshold for handoff.

The following describes the interfaces among the units represented in FIG. 4.

(1) MSC-ACS Interface (link "A")

This is a T1 span with Feature Group D (FG-D) signaling. The MSC 33 outpulsed ANI (the mobile's MIN) and, depending upon the location-transport method, a string of dialed digit which contained information pertaining to the location of the caller.

(2) ACS-MSL interface (link "B")

This is a file-transfer interface between the SDS host 45 and the MSL Server 49 processes. For all mobile-originated calls, a request message including the mobile's MIN and optional location information was written by the SDS Host 45 into a file. The MSL server 49 read the data from the file. The SDS Host 45 and MSL processes were executed on separate machines connected through an ethernet link.

(3) MSL-MSC interface (link "C")

This is a serial connection between the MSL interface unit 50 and the MSC's recent change port. Since Locator 32 is located remotely from Center 33, modems are used on a dial-up telephone line. The MSL's MMI 50 interacted with the MSC 33 to retrieve serving trunk group and member number data for a given MIN when transport Method I is operational.

(4) MSL-ACDS interface (link "D")

This is a file-transfer interface between the MSL Server 49 and the ACDS 46 application processes. The MSL writes its output messages containing the geographic location information into a file which is read by the ACDS application (GIS). Since the MSL and ACDS processes are executed on separate machines, an ethernet connection was used to transport the file read-write messages.

As an alternative to the location-finding schemes discussed above, the geographical location data may be obtained at the mobile station site using an enhanced mobile unit interfaced to an external position location system such as a GPS satellite. Location data for this service consisted of the latitude and longitude information uploaded by the enhanced mobile station. The resolution of this data was dependent upon the capabilities of the positioning equipment used at the mobile station.

For this service (designated transport Method III), an "enhanced" cellular phone employed an attached positioning device capable of determining the current location of the mobile unit. At the mobile operator's command, the enhanced phone read the current location information from the positioning device and automatically initiated a call. The dialed digits comprised a feature code plus the latitude and longitude location information. The Mobile Switching Center recognized this feature code and connected the call to the Assistance Center. In particular, the Switching Center outpulsed the MIN plus the latitude ('lat') and longitude ('lon') which were included in the digits dialed by the cellular phone; the 'lat' required eight digits, and the 'lon' required seven digits. The Switching Center transmitted this information to the Station Locator, which reformatted it and sent it to the Assistance Center for graphical display. Transport Method III is summarized in the following table.

| Location Transport Method | Mobile Dialed Digits | Signaling Data Outpulsed to AC from MSC |
|---|---|---|
| III | *58 + lon (8) + lat (7) | MIN (10) + lon (8) + lat (7) |

The implementation of transport Method III required certain modifications to the mobile system configuration described above. The following discussion recites the enhancements made for the GPS-based implementation.

Enhanced Cellular Phones

Five GTE CCP-2000 Cellular Credit Card Phones (CCP) were modified for use in the aforementioned LATIS trial to implement Transport Method III. The modifications included the software and hardware revisions noted below. Hardware modifications included the following.

The RJ-11 data jack on the side of the CCP was modified to connect directly to the serial port of the CCP's microprocessor. This allowed the CCP to communicate with an attached positioning device via a serial link.

Several modifications were made to the CCP's operating software.

The software polled the serial port once every second looking for location data from the connected positioning device. If data was found and valid position information was included, the data was flagged as valid and stored in a buffer. If no data was found, or if invalid position information was included, the data was flagged as invalid.

The software displayed a location status on the CCP's display. If location data flag indicated valid data in the buffer, the display would be updated with latitude and longitude information alternating every five seconds. If the data was flagged as invalid, an "Invalid Loc Data" message was displayed every five seconds.

The function of the "Data" key was changed to provide the following functionality. When the Data key was pressed by a user/tester, the CCP would automatically initiate a call. The dialed digits included a 3-digit programmable feature code (FC) followed by 15 digits of position information (8 longitude digits followed by 7 latitude digits). Once the call was successfully initiated, control of the CCP was returned to the tester.

The "Lock" key functionality was modified such that it would act as a toggle for a Tracking Mode. If the Tracking Mode was currently off when the Lock key was pressed, the CCP software would enable the mode; if the mode was on when the key was pressed, the software turned off the mode. While in the Tracking Mode, the CCP software maintained complete control of the phone; the tester could only press the Lock key, which would lead to the mode being disabled and control returned to the tester. While in the Tracking Mode, the CCP would initiate calls automatically in a pre-programmed interval. The call initiation was identical to that corresponding to the Data key press, but the duration of the call and the time between calls were determined by a set of programmable parameters.

The CCP's service utility was modified to allow the feature code for the Data key to be programmed. Modifications were made also to allow programming of the feature code, call duration, and between-call interval for Tracking Mode.

The positioning devices were Lowrance OEM GPS receivers, although any such geographical positioning system may be employed. These receivers were capable of receiving signals from location acquisition systems such as GPS satellites, processing the signals, and computing a location estimate based on those signals. One GPS receiver was connected to each CCP-2000 phone through a serial data cable. The GPS receivers automatically forwarded location information messages once every second. These messages contained the receiver status, position status, and position information. The resolution of GPS receivers is highly dependent upon environmental factors and varies continuously. Under typical conditions, a GPS receiver that is receiving data from three or more satellites will have an accuracy of 50 to 100 meters.

While there has been shown and described herein what are presently considered the preferred embodiments of the invention, it will be apparent to those skilled in the art that various changes and modifications can be made therein without departing from the scope of the invention as defined by the appended claims.

What is claimed is:

[1. In a cellular system comprising a plurality of cell sites each including a plurality of mobile stations in communication with a base station, and comprising a plurality of interconnected mobile switching centers each in communication with the base stations of certain cell sites, wherein each mobile switching center maintains network identification data for each mobile station being served in said certain cell sites, a method of determining the location of a mobile station originating communications within a cell site, comprising the steps of:

acquiring the network identification data for said mobile station from the mobile switching center serving said cell site; and translating said acquired network identification data into geographical location information using indexable tables generated from data of trunk groups and member numbers used by each cell site and data front geographic maps of radio coverage for said cell sites.]

[2. The method as recited in claim 1 wherein the acquiring step includes the steps of:

transmitting from the mobile switching center a cellular channel including an identity code assigned to the communicating mobile station;

prompting the mobile switching center with said identity code to request network identification data for said communicating mobile station;

at the mobile switching center, responsively retrieving the requested network identification data using the identity code; and transmitting the network identification data from said mobile switching center.]

[3. The method as recited in claim 2 includes the step of:

developing an information array at the mobile switching center including entries for each mobile station in said cell site indexed by a respective identity code.]

[4. The method as recited in claim 2 wherein:

said cellular channel further includes the mobile station communication.]

[5. In a cellular system comprising a plurality of cell sites each including a plurality of mobile stations in communication with a base station, and comprising a plurality of interconnected mobile switching centers each in communication with the base stations of certain cell sites, wherein each mobile switching center maintains network identification data for each mobile station being served in said certain cell sites, a method of determining the location of a mobile station originating communications within a cell site, comprising the steps of:

transmitting from the mobile switching center a cellular channel including the network identification data for said mobile station;

receiving the transmitted network identification data; and translating the received network identification data into geographical location information using indexable tables generated from data of trunk groups and member numbers used by each cell site and data from geographic maps of radio coverage for said cell sites.]

[6. A location-finding assembly in a cellular system, said system servicing a plurality of mobile stations through a base station connected to a mobile switching center, comprising:

server means responsive to a location request for prompting the mobile switching center for network data on a base station;

said server means including means for receiving network data from the mobile switching center, and means for converting said network data into a corresponding geographical position profile using indexable tables generated from data of trunk groups and member numbers used by each cell site and data from geographic maps of radio coverage for said cell sites.]

*7. In a cellular network, a method comprising:*

*receiving an identity and latitude and longitude coordinates of a mobile station, wherein the identity of the mobile station has been determined based on an emergency call from the mobile station and the latitude and longitude coordinates of the mobile station have been provided by the mobile station;*

*using the latitude and longitude coordinates to determine which type of location data among multiple types of location data is used during the emergency call, wherein a first type of location data is latitude-and-longitude-coordinates-type location data;*

*reformatting the latitude and longitude coordinates to enable displaying the latitude and longitude coordinates at an assistance center; and*

*communicating the identity and the reformatted latitude and longitude coordinates to the assistance center, which processes the emergency call using the identity and the reformatted latitude and longitude coordinates.*

*8. The method of claim 7, wherein receiving the identity and the latitude and longitude coordinates of the mobile station is from the assistance center.*

*9. The method of claim 7, wherein receiving the latitude and longitude coordinates is based on the mobile station placing the emergency call at a geographic position and the latitude and longitude coordinates reflect an approximate position of the mobile station.*

*10. The method of claim 7, wherein the mobile station that provides the received latitude and longitude coordinates includes a Global Positioning System (GPS) receiver receiving information pertaining to the latitude and longitude coordinates of the mobile station from one or more GPS satellites, wherein the mobile station is a cellular telephone.*

*11. The method of claim 7, wherein receiving the identity and the latitude and longitude coordinates of the mobile station is from a mobile switching center (MSC).*

*12. The method of claim 11, wherein the latitude and longitude coordinates provided to the MSC by the mobile station, which includes a Global Positioning System (GPS) receiver receiving information pertaining to the latitude and longitude coordinates of the mobile station, is from one or more GPS satellites, wherein the mobile station is a cellular telephone.*

*13. The method of claim 7, further comprising receiving updates to the latitude and longitude coordinates of the mobile station after receiving the emergency call from the mobile station.*

*14. The method of claim 13, further comprising providing updates to the assistance center by reformatting the updated latitude and longitude coordinates and communicating the reformatted updated latitude and longitude coordinates to the assistance center.*

*15. The method of claim 7, wherein the identity of the mobile station is a telephone number assigned to the mobile station.*

*16. In a cellular network, a method comprising:*

*receiving an identity and latitude and longitude coordinates of a mobile station, wherein the identity of the mobile station has been determined based on an emergency call from the mobile station and the latitude and longitude coordinates have been provided by the mobile station based on a geographic position of the mobile station and the emergency call at the mobile station;*

*using the latitude and longitude coordinates to determine which type of location data among multiple types of location data is used during the emergency call, wherein a first type of location data is latitude-and-longitude-coordinates-type location data;*

*reformatting the latitude and longitude coordinates to enable displaying the latitude and longitude coordinates at an assistance center; and*

*communicating the identity and the reformatted latitude and longitude coordinates to the assistance center, which processes the emergency call using the identity and the reformatted latitude and longitude coordinates and maps the position of the mobile station based on the reformatted latitude and longitude coordinates for purposes of dispatching emergency personnel to the position of the mobile station.*

*17. In a cellular network, a method comprising:*

*receiving a feature code and latitude and longitude coordinates from a mobile station, wherein the feature code corresponds to an emergency call from the mobile station;*

*determining an identity of the mobile station based on the feature code;*

*using the latitude and longitude coordinates to determine which type of location data among multiple types of location data is used during the emergency call, wherein a first type of location data is latitude-and-longitude-coordinates-type location data;*

*communicating the identity and the latitude and longitude coordinates of the mobile station, wherein the communicated identity and latitude and longitude coordinates assist an assistance center in locating the position of the mobile station.*

*18. The method of claim 17, wherein communicating the identity and the latitude and longitude coordinates of the mobile station to a mobile station locator that assists the assistance center by providing data corresponding to the latitude and longitude coordinates of the mobile station to the assistance center is for establishing an approximate position of the mobile station.*

*19. The method of claim 18, further comprising reformatting the received latitude and longitude coordinates for communicating the reformatted latitude and longitude coordinates to the mobile station locator.*

*20. The method of claim 17, wherein receiving the latitude and longitude coordinates is based on the mobile station placing the emergency call at a geographic position and the latitude and longitude coordinates reflect an approximate position of the mobile station.*

*21. The method of claim 17, wherein the mobile station that provides the received latitude and longitude coordinates includes a Global Positioning System (GPS) receiver receiving information pertaining to the latitude and longitude coordinates of the mobile station from one or more GPS satellites, wherein the mobile station is a cellular telephone.*

*22. The method of claim 17, wherein receiving the feature code and the latitude and longitude coordinates of the mobile station from the mobile station via a base station is associated with the mobile station.*

*23. The method of claim 17, wherein receiving the feature code and the latitude and longitude coordinates of the mobile station includes receiving a sequential string of digits, the sequential string of digits including:*

*a first string of alphanumerical characters representing the identity of the mobile station, and*

*a second string of alphanumerical characters representing the latitude and longitude coordinates of the mobile station.*

*24. The method of claim 17, further comprising:*

*recognizing the received feature code as corresponding to an emergency call;*

*connecting the emergency call to the assistance center in response to recognizing the received feature code; and*

*communicating the determined identity and received latitude and longitude coordinates of the mobile station to the assistance center.*

*25. The method of claim 17, further comprising receiving updates to the latitude and longitude coordinates of the mobile station after receiving the emergency call from the mobile station.*

*26. In a cellular network, a method comprising:*

*receiving a first string of alphanumerical characters representing a feature code and a second string of alphanumerical characters representing latitude and longitude coordinates from a mobile station, wherein the feature code corresponds to an emergency call from the mobile station and the latitude and longitude coordinates reflect an approximate position of the mobile station;*

*determining an identity of the mobile station based on the feature code;*

*using the second string of alphanumerical characters to determine which type of location data among multiple types of location data is used during the emergency call, wherein a first type of location data is latitude-and-longitude-coordinates-type location data;*

*communicating the identity and the latitude and longitude coordinates of the mobile station, wherein the communicated identity and latitude and longitude coordinates assist an assistance center in locating the position of the mobile station.*

*27. The method of claim 7, wherein the reformatting using the latitude and longitude coordinates occurs based on the determination.*

*28. The method of claim 7, wherein a second type of location data of the multiple types of location data is cell-and-sector-type location.*

*29. The method of claim 16, wherein a second type of location data of the multiple types of location data is cell-and-sector-type location data.*

*30. The method of claim 17, wherein a second type of location data of the multiple types of location data is cell-and-sector-type location data.*

*31. The method of claim 26, wherein a second type of location data of the multiple types of location data is cell-and-sector-type location data.*

* * * * *